United States Patent
Bowers et al.

(10) Patent No.: US 10,699,210 B2
(45) Date of Patent: Jun. 30, 2020

(54) EVALUATING MODIFICATIONS TO FEATURES USED BY MACHINE LEARNED MODELS APPLIED BY AN ONLINE SYSTEM

(71) Applicant: Facebook, Inc., Menlo Park, CA (US)

(72) Inventors: Stuart Michael Bowers, Menlo Park, CA (US); Hussein Mohamed Hassan Mehanna, Cupertino, CA (US); Andrey Malevich, Redwood City, CA (US); Sai Nishanth Parepally, Sunnyvale, CA (US); David Paul Capel, Belmont, CA (US); Alisson Gusatti Azzolini, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 731 days.

(21) Appl. No.: 14/671,657

(22) Filed: Mar. 27, 2015

(65) Prior Publication Data
US 2016/0283863 A1 Sep. 29, 2016

(51) Int. Cl.
*G06N 20/00* (2019.01)
*G06Q 30/00* (2012.01)
*G06Q 50/00* (2012.01)

(52) U.S. Cl.
CPC ............ *G06N 20/00* (2019.01); *G06Q 30/00* (2013.01); *G06Q 50/01* (2013.01)

(58) Field of Classification Search
CPC ...... G06N 99/005; G06N 20/00; G06N 30/00; G06N 50/01; G06Q 30/00; H04L 65/403
USPC ............................................. 706/12; 709/204
See application file for complete search history.

(56) References Cited

U.S. PATENT DOCUMENTS

| | | | | |
|---|---|---|---|---|
| 2008/0313189 | A1* | 12/2008 | Mehta | G06F 17/30445 |
| 2014/0143324 | A1* | 5/2014 | Lessin | G06F 17/30091 |
| | | | | 709/204 |
| 2014/0143325 | A1* | 5/2014 | Lessin | H04L 65/403 |
| | | | | 709/204 |

OTHER PUBLICATIONS

M. Richardson, E. Dominowska, and R. Ragno, "Predicting clicks: estimating the click-through rate for new ads", WWW '07, Proc. Proc. 16th Int'l Conf. on World Wide Web, May 8-12, 2007, pp. 521-530. (Year: 2007).*

(Continued)

*Primary Examiner* — Vincent Gonzales

(57) ABSTRACT

An online system identifies an additional feature to evaluate for inclusion in a machine learned model. The additional feature is based on characteristics of one or more dimensions of information maintained by the online system. To generate data for evaluating the additional feature, the online system generates various partitions of stored data, where each partition includes characteristics associated with one or more dimensions on which the additional feature is based. Using values of characteristics in a partition, the online system generates values for the additional feature and includes the values of the additional feature in the partition. Values for the additional feature are generated for various partitions based on the values of characteristics in each partition. The online system combines multiple partitions that include values for the additional feature to generate a training set for evaluating a machine learned model including the additional feature.

20 Claims, 3 Drawing Sheets

(56) References Cited

OTHER PUBLICATIONS

G. Szabo, and B. Huberman. "Predicting the popularity of online content", Available at SSRN 1295610, Nov. 4, 2008, 10 pages. (Year: 2008).*

Graepel, Thore et al., "Web-scale Bayesian click-through rate prediction for sponsored search advertising in Microsoft's Bing search engine", Proc. 27th Int'l Conf. on Mach. Learning, Haifa, Israel, 2010, 8 pages. (Year: 2010).*

* cited by examiner

EVALUATING MODIFICATIONS TO FEATURES USED BY MACHINE LEARNED MODELS APPLIED BY AN ONLINE SYSTEM

BACKGROUND

This disclosure relates generally to online systems, and more specifically to training one or more machine learned models used by an online system.

Online systems, such as a social networking system, allow a user to connect and communicate with other users. Users may create profiles on an online system that are tied to their identities and include information about the users, such as interests and demographic information. Users may be individuals or entities such as corporations or charities. An online system receives content from various sources, such as users, and selects content items from the received content for presentation to the user. Interactions between the user and the selected content items are maintained by the online system and communicated to other online system users to facilitate interaction between users and the online system.

When selecting content items for presentation to a user, an online system may use one or more machine learned models that select one or more content items based on features of online system users or content items. For example, a machine learned model associates values with different types of user interactions with a content item and determines likelihoods of a user performing different types of interactions based on characteristics of the user, such as prior interactions by the user, and characteristics of the content item. In this example, the machine learned model generates a value associated with the content item, and the online system determines, based on the determined value, whether to present the content item to the user.

An online system may use one or more machine learned models to select different types of content items for presentation to a user. Different machine learned models may be based on different features of the user or of content items. The large number of features used by different machine learned models makes modification of one or more of the machine learned models cumbersome and time-consuming. For example, testing inclusion of an additional feature in a machine learned model is often time consuming for conventional online systems.

SUMMARY

An online system applies one or more machine learned models to features associated with online system users or content items to generate one or more results. Based on the results, the online system selects content for presentation to a user or determines other information associated with a user or with a content item. A feature may be based on characteristics or values of one or more dimensions. For example, a dimension of a feature is a content item, so the feature depends on characteristics of the content item or values of characteristics of the content item. As another example, a feature depends on characteristics of a user, so the user is a dimension of the feature. Example characteristics of a user include information retrieved from a user profile (e.g., demographic information) associated with the user, actions associated with the user, and connections between the user and other users. Similarly, example characteristics of a content item include interactions associated with the content item, a user associated with the content item, and one or more topics associated with the content item. Additionally, a feature may depend on characteristics of multiple dimensions, such as characteristics of a user and characteristics of an advertisement. Identifying characteristics on which a feature depends based on one or more dimensions including the characteristics allows the online system to more readily retrieve information including the characteristics for determining the feature. An example feature depending on characteristics of multiple dimensions is a number of specific type of actions performed on content items having specific characteristics by users having specific demographic information. Characteristics of one or more dimensions determine values for a feature based on the one or more dimensions. For example, the online system generates a feature associated with various content items based on content items associated with a specific action and one or more characteristics of users performing specific actions with the content item. Different machine learned models may be applied to different types of content items or to different types of users. Additionally, various machine learned models may be used to determine different information associated with a user, with a content item, or with another object maintained by the online system.

A machine learned model may be modified by the online system to include additional features or to differently evaluate features included in the model. Before including an additional feature in a machine learned model, the online system evaluates performance of the machine learned model with the additional feature by applying the model with the additional feature to a training set. The online system may compare results of applying the machine learned model with the additional feature to results from applying the machine learned model to data to determine whether to modify the machine learned model to include the additional feature. Different features may be tested for inclusion in a machine learned model by concurrently applying different machine learned models modified to include different additional features to training sets of data maintained by the online system. For example, the online system modifies a machine learned model to include an additional feature and applies the modified machine learned model to a training set of data while continuing to apply the original machine learned model to data maintained by the online system. Based on results from applying the modified machine learned model to the training set, the online system determines whether to subsequently apply the modified machine learned model to data stored by the online system. If the modified machine learned model provides more accurate or otherwise improved results relative to results from application of the machine learned model when applied to the training set, the online system subsequently applies the modified machine learned model to data.

To test a modified machine learned model, the online system generates a training set form historical data maintained by the online system. The historical data includes prior interactions between online system users and content items as well as characteristics of online system users and content items maintained by the online system. To more efficiently determine performance of a modified machine learned model that includes a new feature, the online system includes the new feature in the training set and applies the modified machine learned model that includes the additional feature to the training set. If an additional feature is dynamic, to more accurately evaluate performance of a modified machine learned model including the additional feature, the online system includes values for the additional feature at different times in the training set based on historical characteristics of different dimensions. To expedite evaluation of the modified machine learned model including the additional feature, the online system generates partitions of the historical data based on the one or dimensions on which the additional feature depends so each partition includes characteristics of the one or dimensions on which the additional feature is based at one or more times. For example, the online system generates multiple partitions of data each including characteristics of different content items if the additional feature is based on characteristics of content items; as another example, if the additional feature is based on characteristics and content items, the online system generates partitions each including characteristics from pairs of content items and users A partition of data is modified to include the additional feature based on characteristics of the one or more dimensions corresponding to the partition of data. For example, a partition of data corresponds to a content item and includes historical data describing interaction with the content item at different times and characteristics of the content item at different times. Values for the additional feature at different times are determined based on characteristics of the content item at the different times and the values for the additional feature are included in the partition of data. Each partition of data is modified to include one or more values for the additional feature. Hence, characteristics of dimensions corresponding to a partition are used by the online system to determine one or more values for the additional feature, simplifying determination of one or more values for the additional feature by using characteristics of dimensions included in the partition. The online system combines the partitions of data modified to include values for the additional feature to generate the training set and applies the modified machine learned model to the training set. Based on results from application of the modified machine learned model to the training set, the online system determines whether to subsequently apply the modified machine learned model to data associated with various dimensions (e.g., content items, users). Partitioning historical data maintained by the online system based on dimensions used to generate values for the additional feature allows the online system to generate values for the additional feature by reducing the historical data maintained by the online system into manageable partitions, which expedites generation of the values for the additional feature without biasing the values generated for the additional feature.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
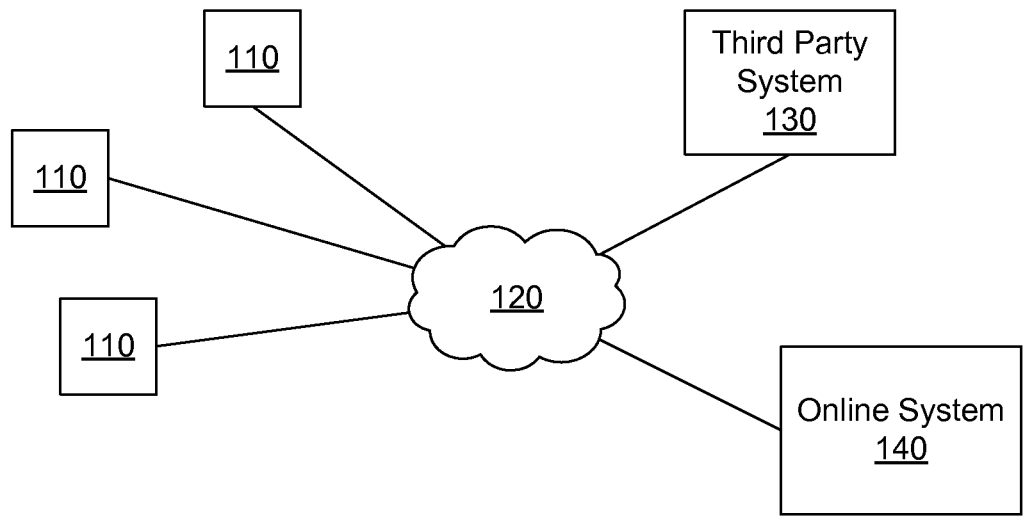
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130.

Figure 2:
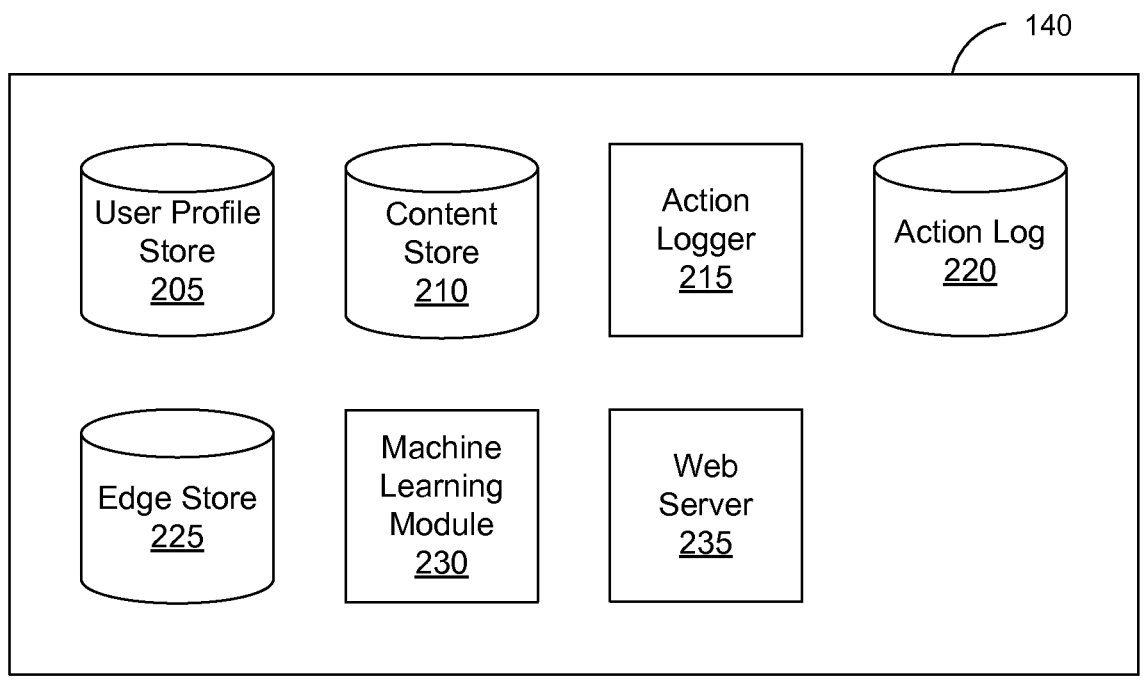
FIG. 2 is a block diagram of an online system, in accordance with an embodiment.

FIG. 2 is an example block diagram of an architecture of the online system 140. The online system 140 shown in FIG. 2 includes a user profile store 205, a content store 210, an action logger 215, an action log 220, an edge store 225, a machine learning module 230, and a web server 235. For example, the online system 140 is a social networking system. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, and checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The machine learning module 230 applies one or more machine learned models to features based on one or more dimensions to generate results that may be used to select content items for presentation to users or to determine other information associated with a user. Example dimensions include content items or users, so the features on which a machine learned model is based depend on characteristics of various users or various content items. Features used by a machine learned model may be based on characteristics of a user retrieved from one or more of the user profile store 205 (e.g., demographic information), the action log 220 (e.g., actions associated with the user), and the edge store 225 (e.g., connections between the user and other users). Features may also be based on characteristics of content items retrieved from the content store 210 or received from a third-party system 130. Features used by a machine learned model may be based on multiple dimensions (e.g., based on characteristics of multiple users, characteristics of multiple content items, characteristics of combinations of users and content items). For example, a feature is based on a type of action associated with users having a particular characteristic or combination of characteristics. As another example, a feature is based on a type of action associated with a content item having one or more specified characteristics.

One or more machine learned models are applied to information maintained by the online system 140 to determine one or more results, such as a likelihood of a user indicating a preference for a content item, a likelihood of a user sharing a content item with another user, or likelihoods of a user performing different actions associated with the content item. Based on the results from applying one or more machine learned models to information associated with content items or with users, the online system 140 determines whether to present various content items to online system users. For example, the machine learning module 230 applies a machine learned model to information describing prior actions with content items by a user, demographic information associated with the user, connections between the user and an additional user associated with a content item, actions by the user with the additional user associated with the content item, characteristics of the content item, as well as any other additional information to determine the user's affinity for the content item. Based on the determined affinity, the online system 140 determines whether to present the content item to the user. Different machine learned models may be applied to different types of content items or to different types of users. Additionally, various machine learned models may be used to determine different information associated with a user, with a content item, or with another object maintained by the online system 140.

The machine learning module 230 may modify one or more machine learned models to improve the results generated by a machine learned model to more efficiently generate results from application of the machine learned model. In some embodiments, the machine learning module 230 modifies a machine learned model to include one or more additional features. The machine learned model 230 may also modify a machine learned model by replacing one or more features used by the machine learned model with alternative features. However, to prevent modification of a machine learned model from impairing performance of the machine learned model, the machine learning module 230 applies the modified machine learned model to a training set and evaluates the results from the modified machine earning model. In various embodiments, the machine learning module 230 continues applying the unmodified machine learned model to data while the modified machine learned model is applied to the training set. This allows the machine learning module 230 to continue applying the original machine learned model to data maintained while performance the modified machine learning module 230 is evaluated on a training set of historical data included in the user profile store 205, the action log 220, or the edge store 225.

In various embodiments, the machine learning module 230 modifies a machine learned model to include an additional feature or identifies an additional feature for inclusion in the machine learned model. For example, the additional feature is a new feature added to the machine learned model or is an alternative feature included in the machine learned model in place of a feature included in the machine learned model. As described above, a feature is based on one or more characteristics of one or more dimensions (e.g., characteristics of a content item and/or of a user). For example, the additional feature is based on one or more characteristics of multiple dimensions maintained by the online system 140. To generate values for the additional feature to evaluate the modified machine learned model, the machine learning module 230 generates a training set including values for the additional feature from information maintained in one or more of the user profile store 205, the content store 210, or the edge store 225. For example, the training set is based on prior interactions by a user, prior interactions with a content item, prior characteristics of a user, prior characteristics of a content item, or other historical data maintained by the online system 140.

To generate the training set, the machine learning module 230 modifies historical data maintained by the online system 140 to include one or more values for the additional feature. As the online system 140 may include a large amount of historical data, the machine learning module 230 generates multiple partitions of data from the historical data based on the dimensions on which the additional feature is based. Hence, each partition includes characteristics of the one or dimensions on which the additional feature is based at one or more times. For example, the machine learning module 230 generates multiple partitions of data each including characteristics of different content items if the additional feature is based on characteristics of content items; as another example, if the additional feature is based on characteristics and content items, the machine learning module 230 generates partitions each including characteristics from pairs of content items and users. Values for the additional feature are included in each partition based on characteristics of the dimensions corresponding to the partitions. For example, values of the additional feature at a specific time are determined by applying one or more additional machine learned models or other processes to values of characteristics of dimensions corresponding to the partition at one or more times prior to the specific time. Each partition of data is modified to include values for the additional feature at one or more times. The machine learning module 230 combines the modified partitions of data to generate the training set and applies the modified machine learned model to the training set. Based on results from applying the modified machine learned model to the training set, the machine learning module 230 determines whether to subsequently apply the modified machine learned model to data rather than the unmodified machine learned model. Generating partitions of data each corresponding to one or more dimensions on which a feature is based from historical data allows the machine learning module 230 to include the additional features to different partitions in parallel, expediting generation of the training set, while preventing biasing of values for the additional feature that are generated from characteristics of the one or dimensions at prior times. Testing of additional features for modifying a machine learned model is further described below in conjunction with FIG. 3.

The web server 235 links the online system 140 via the network 120 to the one or more client devices 110, as well as to the one or more third party systems 130. The web server 140 serves web pages, as well as other web-related content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Figure 3:
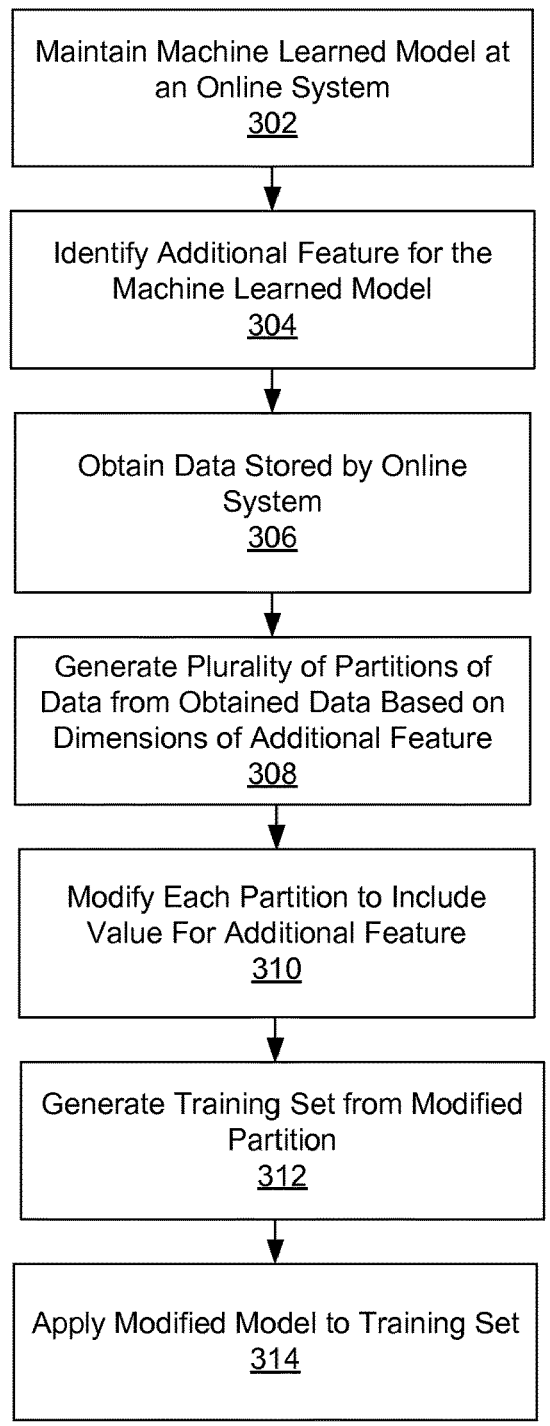
FIG. 3 is a flowchart of a method of testing feature for use by a machine learned model included in an online system, in accordance with an embodiment.

Testing Dynamic Features for Use by a Machine Learned Model Used by the Online System FIG. 3 is a flowchart of one embodiment of a method of testing one or more features for modifying a machine learned model used by an online system 140. In other embodiments, the method may include different and/or additional steps than those shown in FIG. 3. Additionally, steps of the method may be performed in different orders than the order described in conjunction with FIG. 3.

The online system 140 maintains 302 one or more machine learned models. As described above in conjunction with FIG. 2, a machine learned model is applied to various features and generates one or more results. One or more features to which the machine learned model is applied may be dynamic (i.e., variable over time). Based on the generated results, the online system 140 performs one or more actions, such as displaying content items to users. The machine learned model may be applied to multiple dimensions, such as multiple content items or multiple users, with the results for different dimensions based on features of each dimension. Based on the results, the online system 140 may perform an action associated with various dimensions. In some embodiments, the online system 140 may receive a machine learned model from a third party system 130 or other source and store the machine learned model to evaluate modifications to the machine learned model.

An additional feature for inclusion in a machine learned model maintained 302 by the online system 140 is identified 304. For example, the online system 140 receives a description of the additional feature from an online system user. Alternatively, the online system 140 identifies 304 a feature, such as a feature created within a threshold time from a current time, as the additional feature. The additional feature may be a feature that is based on information that is newly maintained by the online system 140 or may be based on a combination of information currently maintained by the online system (e.g., a combination of characteristics of users or of content items). The additional feature may be across multiple dimensions, so it is associated with multiple users, content items, or other objects maintained by the online system. Further, the additional feature may be dynamic, so values of the feature change over time. For example, the additional feature is based on a number of a type of interaction performed by a user, so the value of the feature changes over time based on user interactions with content items or other objects.

To evaluate performance of the machine learned model when modified to include the additional feature, the online system 140 generates a training set of data by obtaining 306 historical data stored by the online system 140. The obtained data may be a subset of data maintained by the online system 140 describing users of the online system and/or content items maintained by the online system 140. For example, the obtained data describes actions associated with various users, demographic information of the users, characteristics of content items with which the users interacted, or characteristics of content items maintained by the online system 140. In some embodiments, the online system 140 organizes the obtained data based on user identifiers associated with various online system users or based on a content item identifier associated with various content items maintained by the online system 140. Hence, the obtained information includes data associated with various dimensions (e.g., various content items, various users) on which features may be based.

From the obtained data, the online system 140 generates 308 a plurality of partitions of data from the obtained data based on the one or more dimensions of the additional feature. Each partition includes characteristics of the one or more dimensions on which the additional feature is based. For example, if the additional feature is based on characteristics of content items, each partition includes characteristics from the obtained data associated with a content item.

As another example, if the additional feature is based on characteristics of content items and characteristics of users, each partition includes characteristics of a user and characteristics of a content item (i.e., each partition includes characteristics associated with a pairing of a user and a content item). For example, if a partition includes data associated with a content item, information in the partition identifies values of features or characteristics of the content item at different times when the content item was presented to a user or at different times when a user interacted with the content item. As characteristics may have different values at different times, a partition includes values for different characteristics of the one or more dimensions corresponding to the partition at different times. For example, if a partition corresponds to a content item, information in the partition identifies values of characteristics of the content item at different times (e.g., times when the content item was presented to a user, times when a user interacted with the content item).

Figure 4:
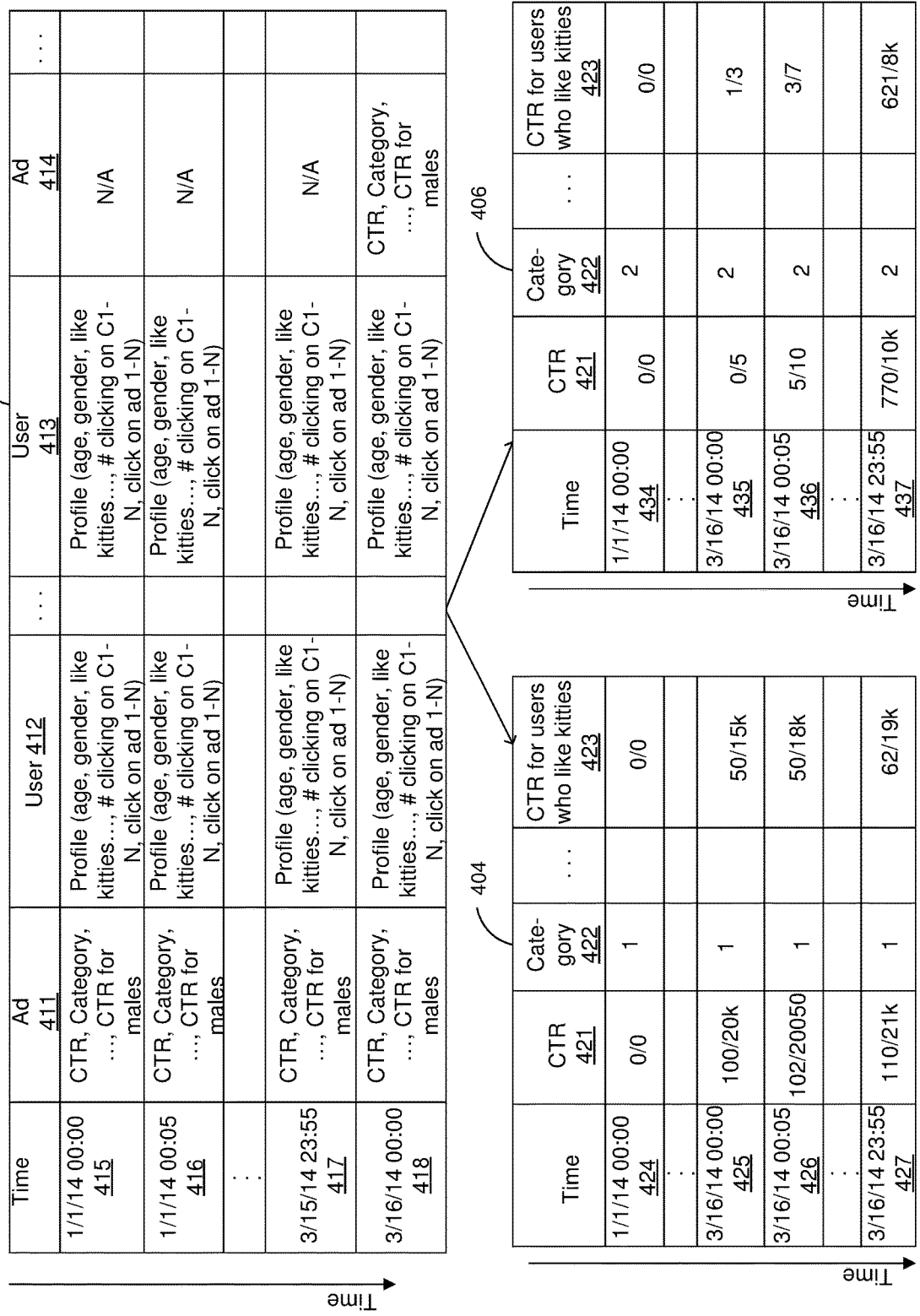
FIG. 4 is an example of generating a training set for evaluating inclusion of an additional feature in a machine learned model included in an online system, in accordance with an embodiment.

In one embodiment, the online system 140 generates 308 a partition by identifying dimensions on which the additional feature is based, determining identifiers associated with the one or more dimensions and retrieving characteristics from the obtained data associated with one or more of the determined identifiers. For example, if the additional feature is based on characteristics of a content item, the online system 140 retrieves data from the obtained data associated with various content item identifiers and generates 308 partitions each including one or more values of characteristics of a content item corresponding to a content item identifier. In some embodiments, a partition is a table including rows corresponding to different times and columns each including a value of a feature or a characteristic; thus, the table identifies values of features or characteristics of one or more dimensions (e.g., a user, a content item) associated with the partition at different times. FIG. 4, further described below, shows an example generation of partitions of data from obtained data.

Based on characteristics included in a partition, the online system 140 determines one or more values for the additional feature and modifies 310 the partition to include the one or more additional values. Each partition is modified 310 to include one or more values for the additional feature based on characteristics of dimensions included in each partition. For example, the online system 140 applies one or more additional machine learned models to values of characteristics of the dimensions on which the additional feature is based that are included in a partition to determine a value for the additional feature. In various embodiments, values of characteristics at times before a current time in a partition are used by the one or more additional machine learned models to determine a value for the additional feature at the current time that is included in the partition. Additionally, a value of the additional feature associated with a time may be based at least in part on one or more values of the additional feature that are associated with times prior to the time. For example, values of one or more characteristics of dimensions included in a partition at earlier times as well as additional factors are used by one or more additional machine learned models to determine a value for the additional feature at a current time. Example factors used by an additional machine learned model to determine one or more values for the additional feature include propagation delay or decay rate. For example, a machine learned model accounts for a propagation delay, such as a time difference between a time when a user takes an action to a time when the action is stored in association with the user by the online system 140, when determining values for the additional feature. As another example, a machine learned model used to determine one or more values or the additional feature accounts for decay rate to account for an expected decrease in an interaction or other quantity over time. Accounting for propagation delays, decay rates, or other factors when determining values for the additional feature allows the online system 140 to more accurately account for changes in values of the feature over time.

Different values may be associated with the additional feature at different times, allowing the modified partition to account for variations in values associated with the additional feature over time. For example, the additional feature of a content item is a number of a specific type of interaction with the content item, so different numbers of the specific type of interaction by users having the particular interest are determined for different times (or for different time intervals) based on values of characteristics of one or more dimensions associated with a partition (in the preceding example, the partition is associated with a dimension corresponding to the content item) at different times; the online system 140 modifies 310 the partition associated with the one or more dimensions to includes the one or more values for the additional feature. As described above, decay rates, propagation delays, or other factors may be included in a machine learned model to determine numbers of the specific type of interaction by users at different time intervals. By generating 308 multiple partitions of data each corresponding to one or more dimensions on which an additional feature is based, the online system 140, values for the additional feature may be determined in parallel, because a partition includes the characteristics used to determine values for the additional feature for the partition without obtaining characteristics from additional sources. Hence, the online system 140 modifies 310 each partition to include values for the additional feature Based on the modified partitions of data, the online system 140 generates 312 a training set. As each partition of data includes values for the additional feature determined based on different characteristics of one or more dimensions, combining the modified partitions generates 312 a training set including various values for the additional feature at different times. In some embodiments, the training partition includes each of the modified partitions of data. Alternatively, the training partition includes a subset of the modified partitions of data (e.g., a specific number of the modified partitions of data).

In various embodiments, the online system 140 applies 314 a modified machine learned model to the training set to generate one or more results. In various embodiments, the online system 140 applies the unmodified machine learned model to data outside of the training set, so the unmodified machine learned model provides results used by the online system 140 for performing actions while the modified machine learned model is evaluated using the training set. The online system 140 may apply the unmodified machine learned model to the training set and compare results from application of the modified machine learned model to the training set and application of the unmodified machine learned model to the training set. Based on the comparison, the online system 140 determines an effect of the additional feature included in the modified machine learned model. The effect of the additional feature may be used by the online system 140 to determine whether to subsequently apply the modified machine learned model to data instead of the unmodified machine learned model. For example, if the results from application of the modified machine learned model to the training set satisfy one or more criteria (e.g., have at least a threshold increase or decrease from the results form application of the machine learning model to the training set), the online system 140 subsequently applies the modified machine learned model to data rather than the machine learned model. The online system 140 may account for whether the change between application of the modified machine learned model to the training set and application of the machine learned model to the training set is an increase or a decrease when determining whether to subsequently apply the modified machine learned model to data.

In one embodiment, the modified machine learned model may be applied to multiple training sets generated 312 by the online system 140 over time and results from application of the modified machine learned model to the multiple training sets stored by the online system 140 and compared to results from application of the machine learned model to the multiple training sets. When a difference between the results from application of the modified machine learned model to the training set satisfies one or more conditions, the online system 140 may subsequently apply the modified machine learned model to data and use results from application of the modified machine learned model to determine whether to perform one or more actions. The online system 140 may alter the modified machine learned model after its application to different training sets to improve results generated from application of the modified machine learned model. For example, a weight associated with the additional feature or weights associated with other features by the modified machine learned model may be altered after the modified machine learned model is applied to a training set and before application of the modified machine learned model to an additional training set.

FIG. 4 is an example of generating a training set for evaluating inclusion of an additional feature in a machine learned model. In the example of FIG. 4, an online system 140 maintains a machine learned model as well as a modified machine learned model that includes an additional feature than the machine learned model. As described above in conjunction with FIGS. 2 and 3, the machine learned model receives a set of features of one or more dimensions and generates one or more results based on the set of features. The modified machine learned model is applied to a training set by the online system 140 to determine whether to subsequently apply the modified machine learning model to data to generate results for determining one or more actions performed by the online system 140.

In the example of FIG. 4, the additional feature included in the modified machine learned model is a click through rate on advertisements for users who like kitties 423. Hence, the additional feature is based on a single dimension of advertisements. The additional feature may be identified by the online system 140 based on the features currently determined for users or based on information associated with users, content items, or other objects by the online system 140. Alternatively, the additional feature may be defined based on information received from a user. Further, in the example of FIG. 4, the machine learned model determines a likelihood of a user accessing an advertisement based on features corresponding to characteristics of the advertisements, including information describing interactions with the advertisements. Based on the likelihood determined by the machine learned model, the online system 140 determines whether to present the advertisement to the user.

To determine whether the modified machine learned model that includes the additional feature of click-through rate by users who like kitties 423 provides a more accurate measure of the likelihood of a user accessing an advertisement compared to the machine learned model, the online system 140 obtains data 402 maintained by the online system 140 and associated with users, content items, or other objects maintained by the online system. The obtained data 402 includes information describing historical click-through rates for various advertisements presented by the online system 140, historical click-through rates by users with various characteristics for various advertisements presented by the online system 140, categories 422 associated with advertisements presented by the online system 140, demographic information associated with users, types of interactions performed by users, frequencies with which various users perform different types of information, etc. Different times 415-418 are associated with various information associated with a content item or a user as the information may vary over time (e.g., numbers of interactions by a user may increase over time as the user performs additional interactions). While FIG. 4 shows the obtained data 402 including information associated with various advertisements 411, 414 and various users 412, 413, information associated with other content items or objects may also be included in the obtained data 402.

As the additional feature of click-through rate by users who like kitties 423 is based on characteristics of an advertisement. To more efficiently generate a training set to evaluate the modified machine learned model and more accurately determine values for the additional feature, the online system 140 generates multiple partitions of data 404, 406 from the obtained data 402. Each partition of data 404, 406 corresponds to the dimension on which the additional feature is based in the example of FIG. 4 and includes characteristics of the dimension from the obtained data 402. In the example of FIG. 4, partition of data 404 corresponds to advertisement 411 and includes characteristics of advertisement 411 determined from the obtained data 402, while partition of data 406 corresponds to advertisement 414 and includes characteristics of advertisement 414 determined from the obtained data 402. For example, the partitions of data 404, 406, include values for click through rates 421, categories 422 associated with the advertisements 411, 414, and additional information. Different times 424-427 are associated with values of various characteristics in partition of data 404 and different times 434-437 are associated with values of various characteristics in partition of data 406, as the values of characteristics may change over time. While FIG. 4 shows an example where partitions of data 404, 405 corresponding to advertisements 411, 414 are generated, in other embodiments, partitions of data corresponding to users 412, 413 may be generated.

In FIG. 4, the online system 140 determines values for the additional feature of click-through rate by users who like kitties 423 for different partitions of data 404, 406 based on characteristics of one or more dimensions included in the different partitions of data 404, 406, and modifies the partitions of data 404, 406 to include one or more values of the additional feature of click-through rate by users who like kitties 423. For example, based on characteristics of advertisement 411 included in partition of data 404, the online system 140 determines values of the additional feature of click-through rate by users who like kitties 423 for advertisement 411 and modifies partition of data 404, which corresponds to advertisement 411, to include values of the additional feature of click-through rate by users who like kitties 423 at various times 424-427. Similarly, the online system 140 modifies partition of data 406 to include values of the additional feature of click-through rate by users who like kitties 423 (determined from characteristics of advertisement 414 and characteristics of various users) at various times 434-437 for advertisement 414 and modifies partition of data 406 to include the values. As described above in conjunction with FIG. 4, one or more additional machine learned models may be applied to characteristics of advertisements or users to determine values for the additional feature of click-through rate by users who like kitties 423. Additionally, the values of the additional feature in a partition at a time may be based on values of various characteristics of the dimension corresponding to the partition at earlier times. Hence, in FIG. 4, a value of the additional feature of click-through rate by users who like kitties 423 in partition of data 404 at time 426 is based on characteristics of advertisement 411 at times 425, 424. The additional machine learned models applied to the characteristics of advertisements or users may determine one or more initial values for the additional feature based on characteristics of additional advertisements or additional users in some embodiments.

By generating multiple partitions of data 404, 406 each including characteristics of the dimensions on which the additional feature is based, the online system 140 may modify different partitions of data 404, 406 in parallel to include values for the additional feature, reducing the time to determine values of the additional feature for different advertisements. Additionally, as each partition of data 404, 406 includes values of characteristics of the dimensions on which the additional feature is based at different times, values for the additional feature at a time in a partition of data 404 may be determined based on values of characteristics, or values of the additional feature, at earlier times included in the partition of data 404. The modified partitions of data 404, 406 are combined by the online system 140 to generate a training set, and a modified machine learned model including the additional feature may be applied to the training set. As described above in conjunction with FIG. 4, the online system 140 determines whether to subsequently apply the modified machine learned model to data based on results from applying the modified machine learned model to the training set.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method, comprising:
   maintaining a machine-learned model at a computing system, the model receiving a plurality of input features and generating an output prediction based on the received features;
   maintaining a training set comprising a plurality of examples, each example of the plurality of examples associated with a plurality of features and a label describing the example;
   identifying an additional feature for the model for a specified time, wherein the additional feature is dynamic, a value for the additional feature based on values of one or more characteristics of content maintained by the computing system at one or more times prior to the specified time;
   obtaining data stored by the computing system and including characteristics of content maintained by the computing system;
   generating a plurality of different partitions of the data stored by the computing system based on the content maintained by the computing system, each partition of data including values of one or more characteristics of the content on which the additional feature is based, wherein each partition corresponds to a respective table that identifies the values of the one or more characteristics of the content;
   modifying each partition of data to include one or more values for the additional feature, a value of the additional feature included in a partition of data determined from values of one or more characteristics of the content on which the additional feature is based that are included in the partition of data and are associated with one or more times prior to the current time;
for each example in the training data set, computing the value of the additional feature based on the partition of data comprising values of characteristics of content associated with a time prior to the specified time;
updating the training set to include values of the additional feature for each example; and
training a modified model including the additional feature using the training set to generate an updated model.

2. The method of claim 1, wherein modifying each partition of data to include one or more values for the additional feature is based on characteristics of content associated with the partition of data, and wherein modifying each partition of data further comprises:
modifying a plurality of partitions of data in parallel to include one or more values for the additional feature.

3. The method of claim 1, wherein content maintained by the computing system is selected from a group consisting of: a user, a content item, and any combination thereof.

4. The method of claim 1, wherein modifying each partition of data to include one or more values for the additional feature is based on characteristics of content associated with the partition of data, and wherein modifying each partition of data further comprises:
modifying the partition of data to include a plurality of values for the additional feature, each value for the additional feature associated with a different time.

5. The method of claim 4, wherein a value for the additional feature associated with a time is based at least in part on one or more values of the additional feature associated with one or more times prior to the time.

6. The method of claim 1, wherein modifying each partition of data to include one or more values for the additional feature is based on characteristics of content associated with the partition of data, and wherein modifying each partition of data further comprises:
generating a value for the additional feature associated with a time by applying one or more additional models to values of one or more characteristics of the content on which the additional feature is based that are included in the partition of data and that are associated with times before the time;
including the generated values in the partition of data.

7. The method of claim 6, wherein the one or more additional models account for one or more selected from a group consisting of: a decay rate, a propagation delay, and any combination thereof.

8. The method of claim 1, further comprising:
applying the model to the training set to generate one or more alternative results;
determining whether a difference between the one or more results and the one or more alternative results satisfies one or more criteria; and
responsive to determining that the difference between the one or more results satisfies the one or more criteria, replacing the model with the modified model.

9. A computer-implemented method comprising:
maintaining a machine-learned model at a computing system, the model receiving a plurality of input features and generating an output prediction based on the received features;
maintaining a training set comprising a plurality of examples, each example of the plurality of examples associated with a plurality of features and a label describing the example;
identifying an additional feature for the model for a specified time, wherein the additional feature is dynamic, a value for the additional feature based on values of one or more characteristics of content maintained by the computing system at one or more times prior to the specified time;
obtaining data stored by the computing system and including characteristics of;
generating a plurality of different partitions of the data stored by the computing system based on the content maintained by the computing system, each partition of data including values of one or more characteristics of the content on which the additional feature is based, wherein each partition corresponds to a respective table that identifies the values of the one or more characteristics of the content;
modifying each partition of data to include one or more values for the additional feature, a value of the additional feature included in a partition of data determined from values of one or more characteristics of the content on which the additional feature is based that are included in the partition of data and are associated with one or more times prior to the current time;
for each example in the training data set, computing the vaue of the additional feature based on the partition of data comprising values of characteristics of content associated with a time prior to the specified time;
updating the training set to include values of the additional feature for each example; and
training a modified model including the additional feature using the training set to generate an updated model.

10. The method of claim 9, wherein modifying each partition of data to include one or more values for the additional feature is based on characteristics of content associated with the partition of data, and wherein modifying each partition of data further comprises:
modifying a plurality of partitions of data in parallel to include one or more values for the additional feature.

11. The method of claim 9, wherein content maintained by the computing system is selected from a group consisting of: a user, a content item, and any combination thereof.

12. The method of claim 9, wherein modifying each partition of data to include one or more values for the additional feature is based on characteristics of content associated with the partition of data, and wherein modifying each partition of data further comprises:
modifying the partition of data to include a plurality of values for the additional feature, each value for the additional feature associated with a different time.

13. The method of claim 12, wherein a value for the additional feature associated with a time is based at least in part on one or more values of the additional feature associated with one or more times prior to the time.

14. The method of claim 9, wherein modifying each partition of data to include one or more values for the additional feature is based on characteristics of content associated with the partition of data, and wherein modifying each partition of data further comprises:
generating a value for the additional feature associated with a time by applying one or more additional models to values of one or more characteristics of the content on which the additional feature is based that are included in the partition of data and that are associated with times before the time;

including the generated values in the partition of data.

15. The method of claim 14, wherein the one or more additional models account for one or more selected from a group consisting of: a decay rate, a propagation delay, and any combination thereof.

16. The method of claim 9, wherein generating the training set by combining the modified partitions of data comprises:

generating the training set by combining a subset of the modified partitions of data.

17. A computer program product comprising a non-transitory computer readable storage medium having instructions encoded thereon that, when executed by a processor, cause the processor to: maintaining a machine-learned model at a computing system, the model receiving a plurality of input features and generating an output prediction based on the received features;

maintaining a training set comprising a plurality of examples, each example of the plurality of examples associated with a plurality of features and a label describing the example;

identifying an additional feature for the model for a specified time, wherein the additional feature is dynamic, a value for the additional feature based on values of one or more characteristics of content maintained by the computing system at one or more times prior to the specified time;

obtaining data stored by the computing system and including characteristics of;

generating a plurality of different partitions of the data stored by the computing system based on the content maintained by the computing system, each partition of data including values of one or more characteristics of the content on which the additional feature is based, wherein each partition corresponds to a respective table that identifies the values of the one or more characteristics of the content;

modifying each partition of data to include one or more values for the additional feature, a value of the additional feature included in a partition of data determined from values of one or more characteristics of the content on which the additional feature is based that are included in the partition of data and are associated with one or more times prior to the current time;

for each example in the training data set, computing the value of the additional feature based on the partition of data comprising values of characteristics of content associated with a time prior to the specified time;

updating the training set to include values of the additional feature for each example; and training a modified model including the additional feature using the training set to generate an updated model.

18. The computer program product of claim 17, wherein content maintained by the computing system is selected from a group consisting of: a user, a content item, and any combination thereof.

19. The computer program product of claim 17, wherein modify each partition of data to include one or more values for the additional feature is based on characteristics of content associated with the partition of data, and wherein modify each partition of data further comprises:

modify the partition of data to include a plurality of values for the additional feature, each value for the additional feature associated with a different time.

20. The computer program product of claim 19, wherein a value for the additional feature associated with a time is based at least in part on one or more values of the additional feature associated with one or more times prior to the time.

* * * * *